(12) United States Patent
Pfeiffer

(10) Patent No.: US 6,460,683 B1
(45) Date of Patent: Oct. 8, 2002

(54) CONVEYOR WITH FLEXIBLE ZONE PARAMETER CONTROL

(75) Inventor: Michael W. Pfeiffer, Richfield, MN (US)

(73) Assignee: Seagate Technology LLC, Scotts Valley, CA (US)

(*) Notice: Subject to any disclaimer, the term of this patent is extended or adjusted under 35 U.S.C. 154(b) by 3 days.

(21) Appl. No.: 09/717,780

(22) Filed: Nov. 21, 2000

Related U.S. Application Data

(60) Provisional application No. 60/166,808, filed on Nov. 22, 1999.

(51) Int. Cl.[7] .................. B65G 43/00; B65G 47/26; B65G 47/31; B65G 13/06
(52) U.S. Cl. .................. 198/460.1; 198/781.05; 198/781.06
(58) Field of Search .................. 198/460.1, 781.05, 198/781.06

(56) References Cited

U.S. PATENT DOCUMENTS

| | | | |
|---|---|---|---|
| 3,716,129 A | 2/1973 | Sadler, Jr. ............... | 198/127 |
| 4,793,262 A | 12/1988 | Horn ....................... | 104/168 |
| 5,076,420 A | 12/1991 | Kuschel .................. | 198/781 |
| 5,086,910 A | 2/1992 | Terpstra .................. | 198/572 |
| 5,211,281 A | 5/1993 | Almes ..................... | 198/781 |
| 5,285,887 A | 2/1994 | Hall ........................ | 198/460 |
| 5,318,167 A | 6/1994 | Bronson et al. ......... | 198/577 |
| 5,456,347 A * | 10/1995 | Best et al. ............ | 198/781.06 |
| 5,558,206 A | 9/1996 | Helgerson et al. ...... | 198/781.04 |
| 5,582,286 A * | 12/1996 | Kalm et al. ............ | 198/781.06 |
| 5,730,274 A | 3/1998 | Loomer .................. | 198/460.1 |
| 5,862,907 A | 1/1999 | Taylor .................... | 198/781.05 |
| 5,904,239 A | 5/1999 | Narisawa ................. | 198/783 |
| 5,960,930 A * | 10/1999 | Hawkins ................. | 198/577 X |
| 5,971,137 A | 10/1999 | Grant et al. ............ | 198/782 |
| 6,021,888 A | 2/2000 | Itoh et al. ............... | 198/783 |
| 6,047,812 A | 4/2000 | Horn et al. ............. | 198/781.06 |
| 6,302,266 B1 * | 10/2001 | DeFrancisco et al. ............... | 198/781.06 X |
| 6,315,104 B1 * | 11/2001 | Ebert ..................... | 198/460.1 X |

* cited by examiner

*Primary Examiner*—Christopher P. Ellis
*Assistant Examiner*—Gene O. Crawford
(74) *Attorney, Agent, or Firm*—Westman, Champlin & Kelly, P.A.

(57) ABSTRACT

A conveyor with flexible zone parameter control. A flexible zone conveyor includes a zone address interface coupled to at least one zone control unit to configure the at least one zone control unit to control a designated series of motors along a conveyor path to provide a flexible control zone adaptable for different product applications. Control parameters for the control zone can be user defined for flexible operating control.

20 Claims, 11 Drawing Sheets

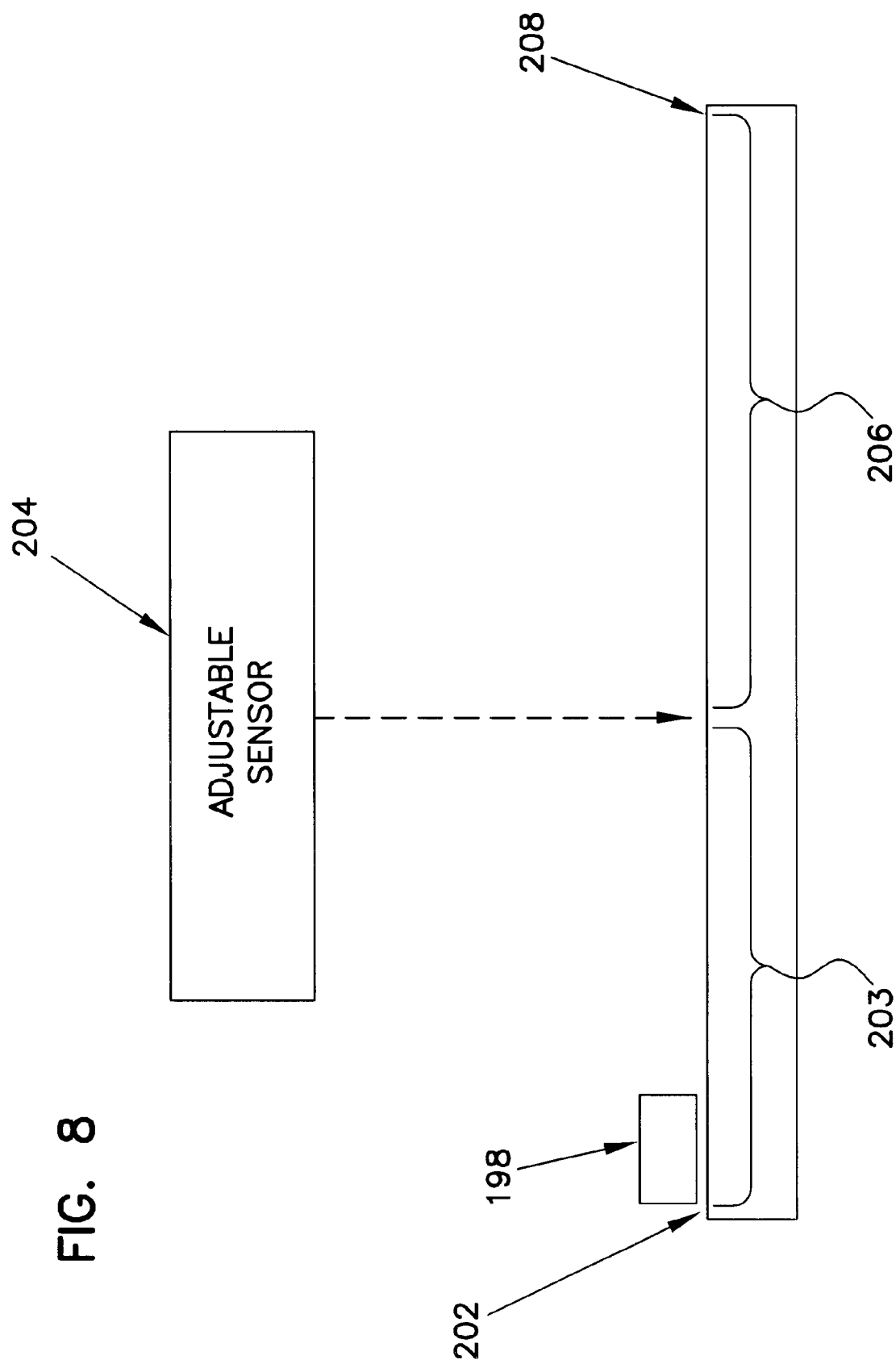

US 6,460,683 B1

CONVEYOR WITH FLEXIBLE ZONE PARAMETER CONTROL

CROSS-REFERENCE TO RELATED APPLICATION

The present application claims priority to Provisional Application Ser. No. 60/166,808, filed Nov. 22, 1999, and entitled "ROLLER CONVEYOR WITH FLEXIBLE ZONE PARAMETER CONTROL".

FIELD OF THE INVENTION

The present invention relates to a conveyor with zone control. In particular, the present invention relates to a conveyor with flexible zone control.

BACKGROUND OF THE INVENTION

Automated manufacturing systems use conveyors to carry a workpiece or product along a conveyor path to various stations for manufacture or assembly. Workpieces are deposited to the conveyor and intermittently moved along the conveyor to various operation stations for manufacture or assembly. During assembly operations it is desirable to sequence movement of the workpieces along the conveyor path to maintain sufficient workpiece spacing so that workpieces do not stack up or crash into one another while the workpieces are stopped at various stations for assembly.

Prior conveyor systems incorporate zone control systems for controlling movement of workpieces along the conveyor path. The conveyor path is divided into multiple fixed control zones. Each fixed control zone includes at least one drive mechanism for moving workpieces in the zone and at least one sensor for controlling operation of the drive mechanism in the zone or adjacent zones. Zone length or size is configured based upon workpiece size or length. Thus, use of the zoned conveyor is limited to the particular product size for which the conveyor has been configured and does not provide flexibility for different product or workpiece sizes. For example, different form factor disc drives and drive components have different dimension sizes, and thus fixed zone conveyors do not provide flexibility for use for different form factor drives and components. The present invention addresses these and other problems and offers solutions and advantages over the prior art.

SUMMARY OF THE INVENTION

The present invention relates to a conveyor with flexible zone parameter control which provides flexibility for use with different products or workpieces having different dimensions and sizes. A flexible zone conveyor of the present invention includes a zone address interface coupled to at least one zone control unit to configure the at least one zone control unit to control a designated series of motors along a conveyor path to provide a flexible control zone adaptable for different product applications. Control parameters for the control zone can be user defined for flexible operating control.

BRIEF DESCRIPTION OF THE DRAWINGS

FIGS. 3-1 and 3-2 are schematic illustrations of an embodiment of a user address interface system for flexible zone control.

FIG. 5-1 is a detailed illustration of an embodiment of a zone control unit.

FIG. 6-1 is an end view of the conveyor section of FIG. 5 illustrating an alternate sensor embodiment.

FIG. 8 is a schematic illustration of an embodiment of a flexible control zone.

DETAILED DESCRIPTION OF ILLUSTRATIVE EMBODIMENTS

Figure 1:
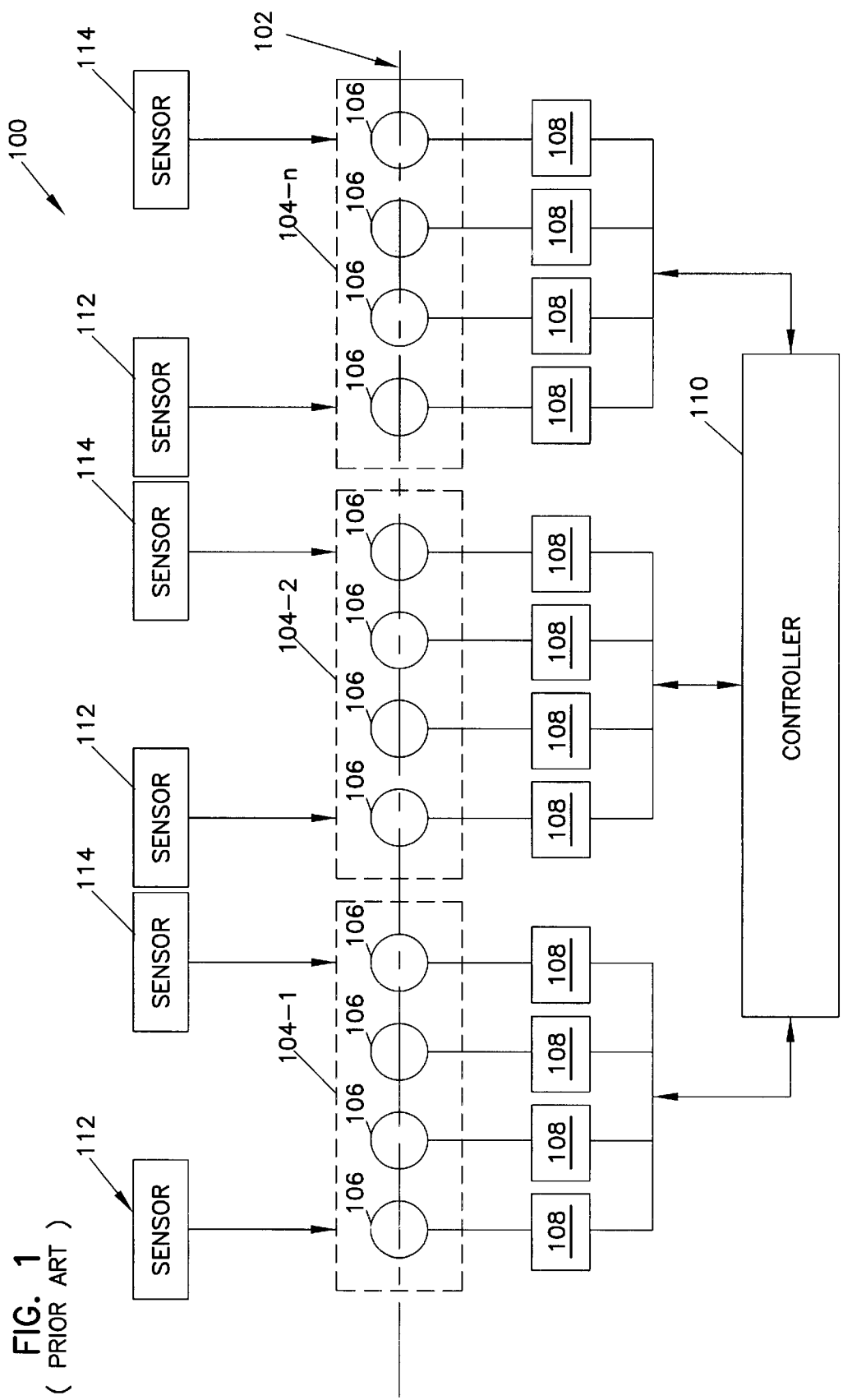
FIG. 1 is a schematic illustration of a zone control system of the prior art.

FIG. 1 schematically illustrates prior conveyor systems 100 having zone control. The conveyor system 100 conveys a workpiece (not shown) along a conveyor path as illustrated by line 102 in FIG. 1. As shown, the conveyor path 102 includes a plurality of fixed control zones 104-1, 104-2, 104-n as schematically illustrated. Each zone 104-1, 104-2, 104-n includes a plurality of rollers 106 driven by motors 108 as illustrated diagrammatically. The motors 108 are operably coupled to a controller 110. The controller 110 synchronously controls each of the motors 108 in the separate zones 104-1, 104-2, 104-n based upon sensed feedback from fixed sensors 112, 114 in each zone. The controller 110 coordinates operation of the motors 108 in each of the control zones 104-1, 104-2, 104-n so that the motors 108 in each zone functionally operate as a single fixed drive unit to form fixed control zones 104-1, 104-2, 104-n.

Figure 2:
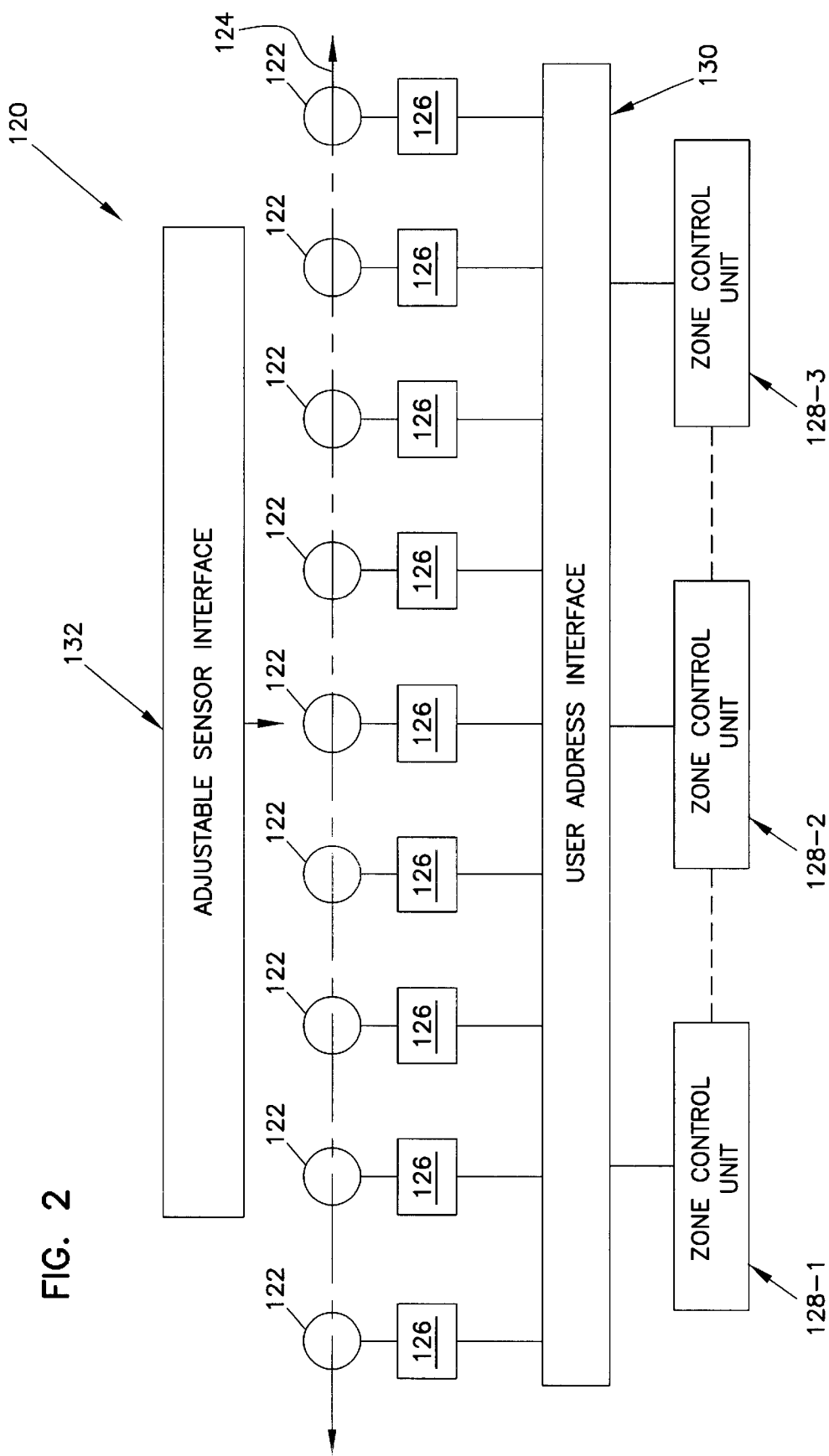
FIG. 2 is a schematic illustration of an embodiment of a flexible zone control system of the present invention.

FIG. 2 schematically illustrates an embodiment of a flexible zone control conveyor system 120 of the present invention. As shown, the conveyor system 120 includes a plurality of rollers 122 extending along a conveyor path 124. In the embodiment shown, each roller 122 is separately operated by a motor 126. Operation of each of the motors 126 is controlled by at least one of a plurality of flexible zone control units 128-1, 128-2, 128-n to form a plurality of separate control zones along the length of the conveyor path 124. Each of the zone control units 128 controls a designated series of motors 126 so that the designated series of motors 126 functionally operate as a single drive unit as will be explained.

The number of designated motors 126 (or rollers 122) coupled to each zone control unit 128 determines the length of the control zone. The desired control zone length depends upon the size of the workpiece conveyed. Preferably, larger workpieces require longer control zones than smaller workpieces. As described, each zone control unit 128 operates a designated series of motors 126 and the particular designation of motors 126 can be adjusted to adjust the control zone length depending upon the particular control application for flexible zone control. Flexible zone control of the present invention provides advantages and features over prior conveyors.

As illustrated diagrammatically, the system includes a user address interface 130 to configure the zone control units 128 to control a particular designated series of motors 126 depending upon the particular control application. The user address interface 130 allows the user to designate or assign motors 126 (rollers) which are controlled by each of the zone control units 128-1, 128-2, 128-n as will be explained. As also shown, the control system includes an adjustable sensor interface 132 which is adjusted based upon the particular zone configuration to provide zone control feedback.

Figures 1, 3:
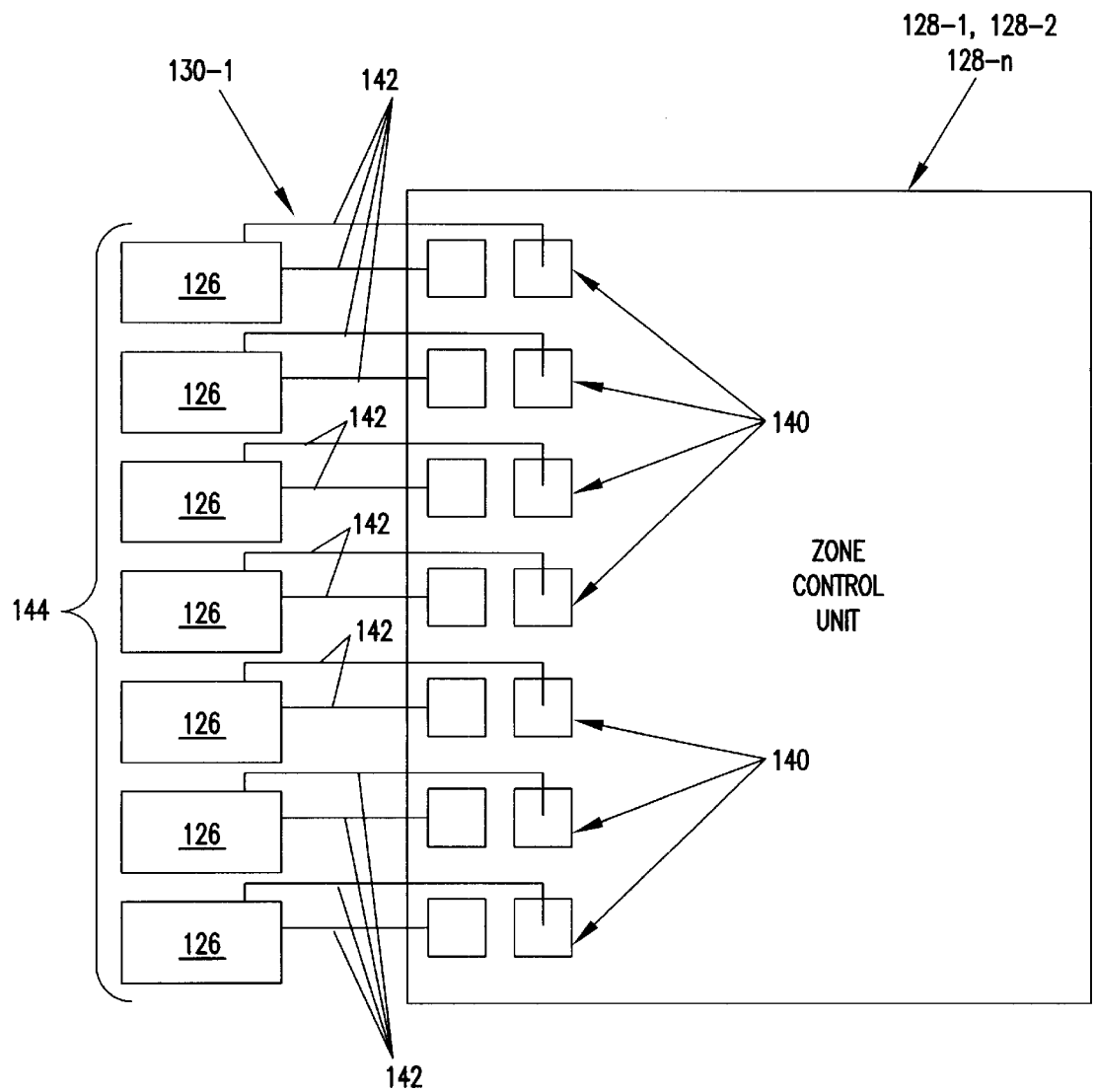
Figures 2, 3:
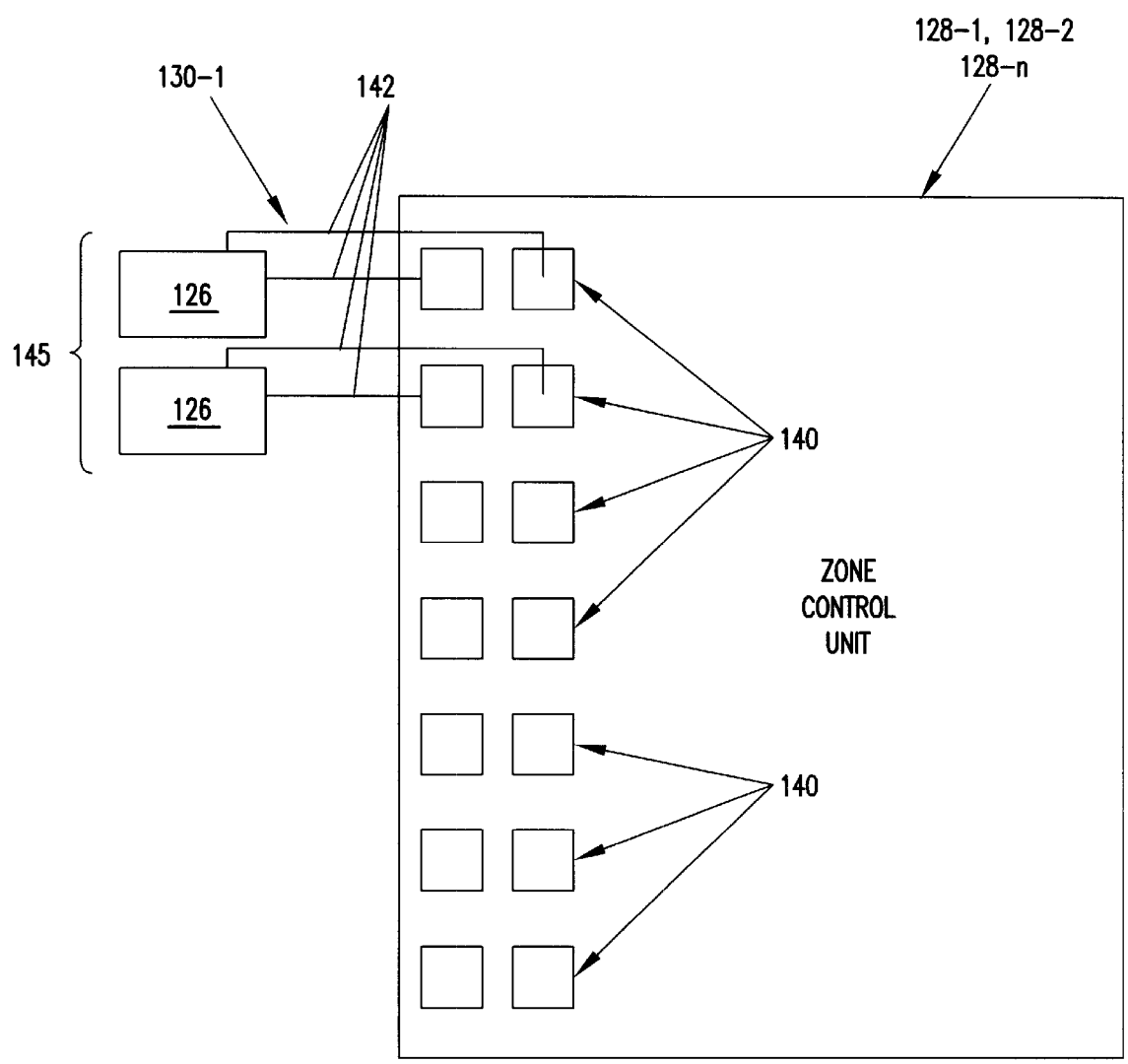

FIGS. 3-1 and 3-2 illustrate one embodiment of a user address interface 130-1 for flexible zone control. As shown, each zone control unit 128-1, 128-2, 128-n includes a plurality of terminals 140 operably coupled to circuitry of the zone control unit 128-1, 128-2, 128-n. Motor leads 142 from a designated series of motors 144 are connected to terminals 140 of the zone control units 128-1, 128-2, 128-n. As shown, the designated series of motors 144 illustrated in FIG. 3-1 includes 7 motors 126. Thus, in the illustrated embodiment of FIG. 3-1, designated series of motors 144 are connected to a zone control unit 128 to form a single control zone powering the designated series of motors 144. In FIG. 3-2, the designated series of motors 145 includes two motors 126 coupled to zone control units 128 to form a control zone having a smaller zone length than that illustrated in FIG. 3-1. Motor leads 142 are removably connected to terminals 140 to provide a conveyor with flexible zone control which is easily adaptable to alternate zone configurations.

Figure 4:
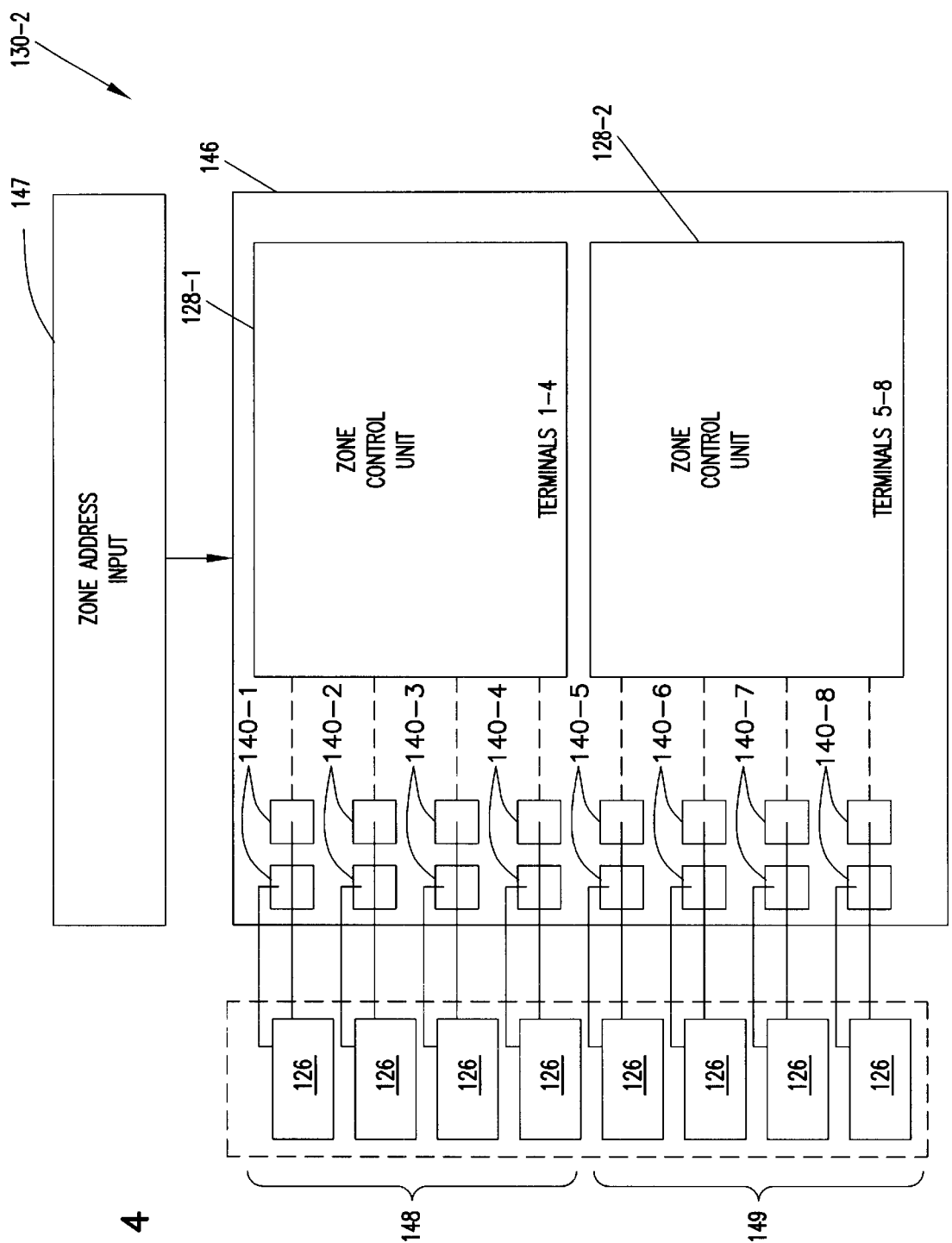
FIG. 4 is a schematic illustration of an alternate embodiment of a user address interface system for flexible zone control.

FIG. 4 illustrates an alternate embodiment of a programmable user address interface 130-2 for flexible zone control. As shown in FIG. 4, device terminals 140 are coupled to a programmable controller 146. An input device 147 is connected to the controller 146 to configure zone control units 128 to control designate series of motors 148, 149. As schematically shown, the zone control units 128-1, 128-2 are programmed to control series of motors 148, 149 coupled to selected device terminals 140. For example, in the embodiment illustrated in FIG. 4, controller 146 is configured to define zone control units 128-1 and 128-2 controlling designated motors 148, 149 coupled to terminals (140-1, 140-2, 140-3, 140-4) and terminals (140-5, 140-6, 140-7, 140-8), respectively.

Figure 5:
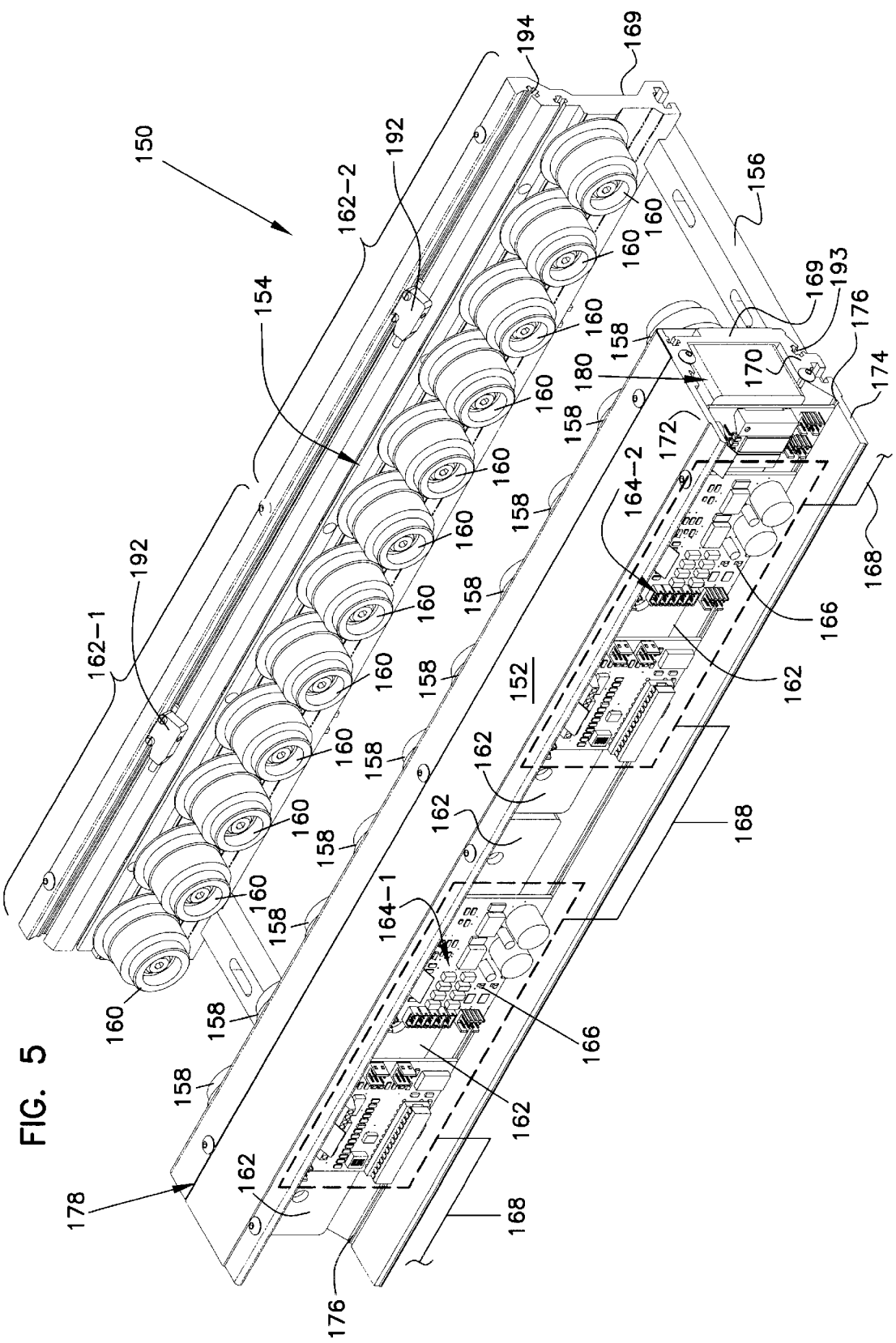
FIG. 5 is a perspective illustration of a conveyor section with flexible zone control.
Figures 1, 5:
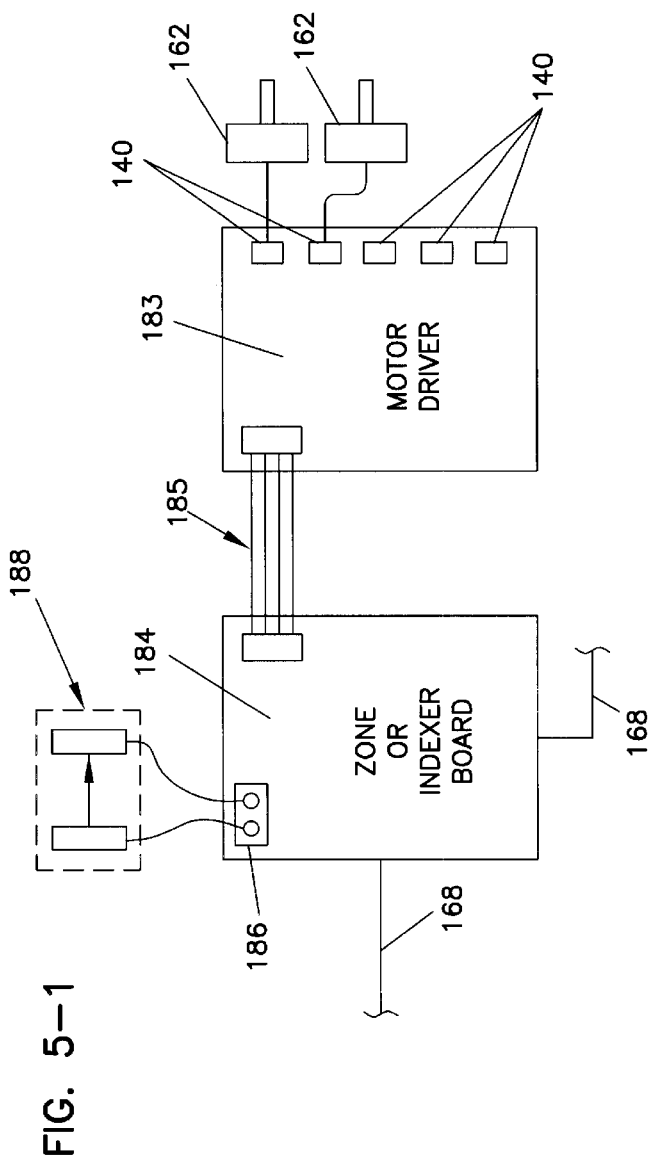
Figure 6:
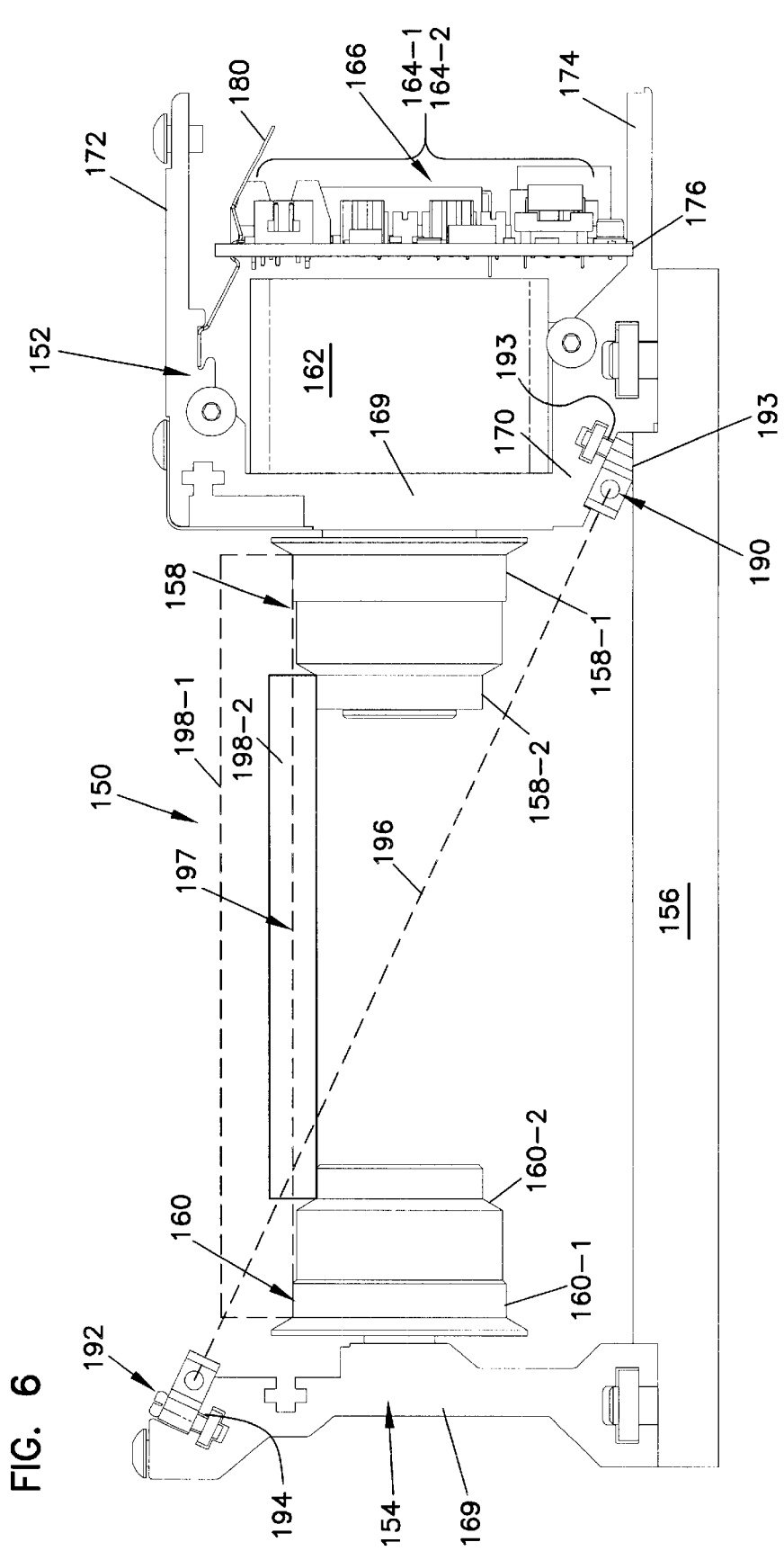
FIG. 6 is an end view of the conveyor section of FIG. 5.
Figures 1, 6:
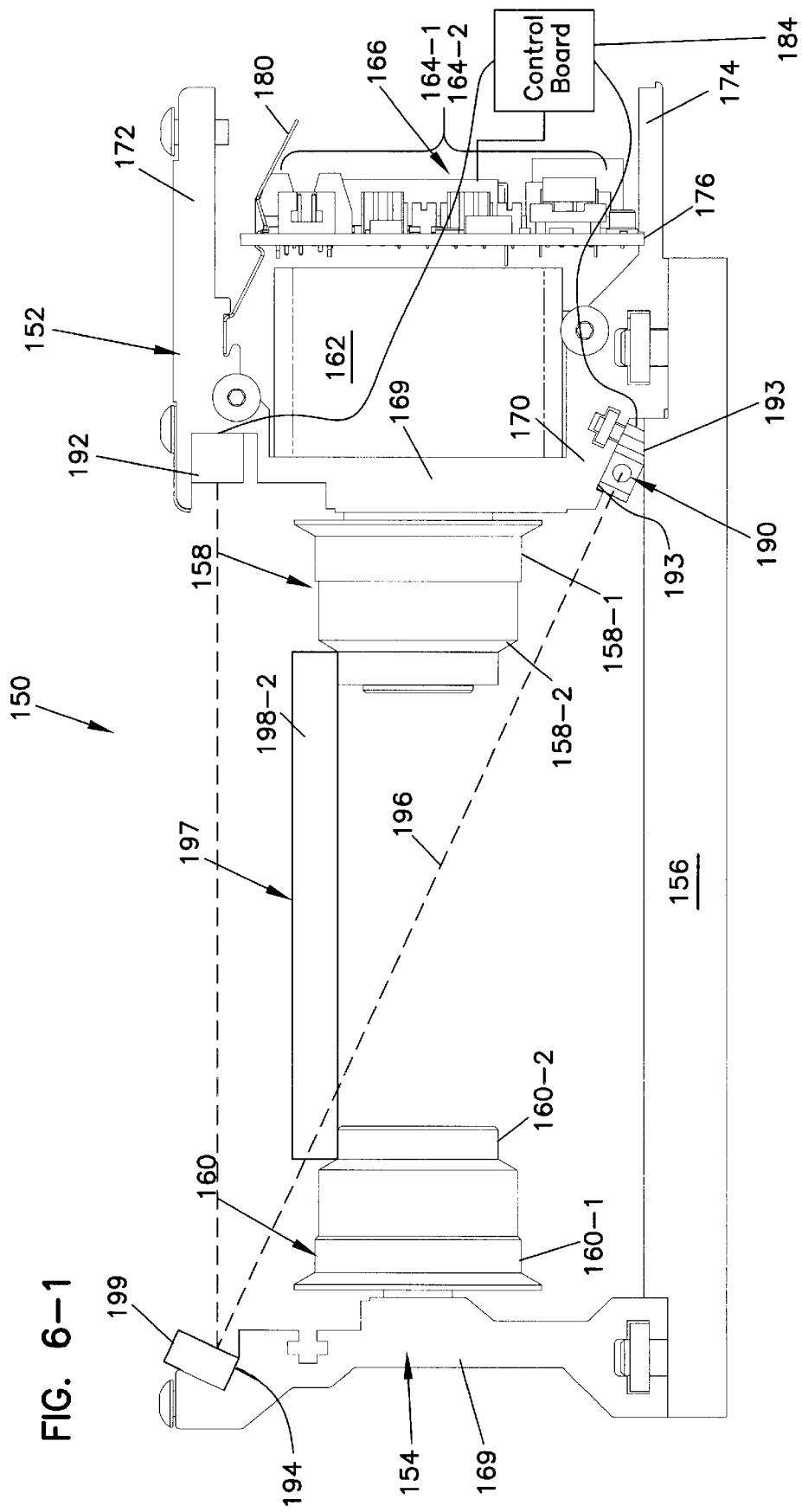

FIGS. 5–6 illustrate an embodiment of a conveyor section 150 incorporating flexible zone control of the present invention. Multiple conveyor sections 150 are connected to form a continuous conveyor path (not shown). As shown, conveyor section 150 includes opposed spaced rails 152, 154 connected by a cross bracket 156. Rails 152, 154 include a plurality of roller wheels 158, 160 spaced therealong. In the embodiment shown, roller wheels 158 are driven by motors 162 coupled to each of the roller wheels 158 and spaced along rail 152.

The inclusion of a drive motor 162 for each roller wheel 158 provides desired flexibility for adjusting zone length for flexible zone configurations, although application is not limited to the particular embodiment shown. For example, in an alternate embodiment every other roller wheel 158 can be powered by a motor 162. In the illustrated embodiment, roller wheels 160 spaced along rail 154 are idle and are not motor driven. However, in an alternate embodiment, roller wheels 160 could be similarly powered with roller wheels 158 and application is not limited to driven wheels along a single rail 152.

As shown in FIG. 5, series of motors 162-1, 162-2 are controlled by local zone control units 164-1, 164-2 supported at spaced locations along rail 152. Local zone control units 164-1, 164-2 include rigid circuit cards 166 supporting a plurality of motor terminals and control circuitry for localized zone process control. Each zone control unit 164-1, 164-2 is coupled to an adjacent zone control unit 164-1, 164-2 as illustrated by line 168 to coordinate operation between local control zones 164-1, 164-2 so that workpieces are not delivered to a zone unless the zone is ready to receive the workpiece. In the embodiment shown, circuit cards 166 are slideably supported along rail 152 to position cards 166 proximate to the designate series of motors 162-1, 162-2 for flexible zone control. Circuit card 166 could be flexible or formed of a rigid material.

As shown in FIG. 6, rails 152, 154 include an edge portion 169 supporting roller wheels 158, 160. Rail 152 includes a stepped ledge 170 supporting motors 162 along rail 152. Rail 152 also includes upper and lower spaced rail plates 172, 174 extending from edge portion 169. Circuit cards 166 are slideably supported in an elongated slot 176 extending along rail 152 and formed in rail plate 174. Preferably, slot 176 extends between opposed ends 178, 180 of rail 154 as shown in FIG. 5 so that cards 166 can be added or removed from rail 152 as necessary depending upon the desired zone configurations.

Cards 166 are spring biased in slot 176 for operation by spring 182 coupled to upper rail 172 as shown in FIG. 6 to retain the cards 166 in the slot 176. In one embodiment shown in FIG. 5-1, the local control zone units 164-1, 164-2 or card 166 include a motor driver board 183 having a plurality of motor terminals 140 and a zone indexer board 184 connected to the motor driver board 183 via a ribbon cable 185. Motor driver board 183 and zone indexer board 184 are slidably supported in slot 176. Indexer board 184 includes a terminal connection 186 for a sensor unit 188 (illustrated schematically) for feedback control. Multiple driver boards 183 can be connected to the indexer board 184 with multiple removable ribbon cable connections depending desired number of designated motors in the control zone.

Sensor unit is also slideably supported along the conveyor to provide feedback control for the local zone control units 164-1, 164-2 depending upon the particular control zone configuration. In the embodiment shown in FIG. 6, sensor unit includes cooperating sensors 190, 192 adjustably supported on rails 152, 154. The sensors 190, 192 are slideably along slots 193, 194 on rails 152, 154 as shown in FIGS. 5–6. The sensors 190, 192 cooperatively transmit and receive signals for detecting the presence of a workpiece along the conveyor path. In the particular embodiment shown, sensor 192 is supported in a raised position relative to a support surface of wheels 158, 160 and sensor 190 is supported below the support surface of wheels 158; 160. Sensors 190, 192 are supported to provide a diagonal path 196 as previously described for a sensor signal transmitted between sensors 190, 192. The diagonal path 196 crosses or intersect a conveyor plane 197 to detect workpiece 198 illustrated diagrammatically regardless of product height or dimension.

Preferably, sensor 192 includes a sensor element that transmits a signal which is detected by sensor 190. Sensor 190 is preferably supported on rail 152 to electrically couple to the zone control unit 164 to provide desired feedback control for the control zone. Alternatively, a single reflective sensor unit can be mounted on rail 152 or 154 to transmit and receive a signal if reflected off a workpiece supported in the transmission path. If the transmitted signal is not detected then there is no workpiece in the transmission path to reflect the transmitted signal. In the embodiment described, the single sensor is mounted on rail 152 to connect to zone control circuitry as described and the transmission path is diagonal to intersect the workpiece regardless of product elevation or height.

In an alternate embodiment shown in FIG. 6-1, rail 152 supports a sensor 190 that transmits a sensor signal and rail 154 supports a mirror 199 to reflect the transmitted signal from sensor 190 to sensor 192 supported on rail 152 as shown. Thus, both sensors 190, 192 are supported on rail 152 for easy connection to control circuitry or board 184 illustrated schematically without extensive wiring across rails. In the embodiment shown, sensor 190 transmits a diagonal signal to mirror 199 which is horizontally reflected to sensor 192, although alternative transmission paths may be employed between sensors 190, 192 and mirror 199 and application is not limited to the specific embodiment shown.

As shown in FIGS. 6 and 6-1, roller wheels 158, 160 are adapted to support workpieces 198-1, 198-2 of varied width dimensions for example different form factor disc drives or components. Roller wheels 158, 160 include multiple stepped portions 158-1, 158-2 and 160-1, 160-2. Cooperating stepped portions 158-1, 160-1; and 158-2, 160-2 form recessed conveyor segments for conveying product of incremental widths, for example, different form factor disc drives or components. Thus, as described the position of local zone control units 164-1, 164-2 can be adjusted for different control zone configurations.

Figure 7:
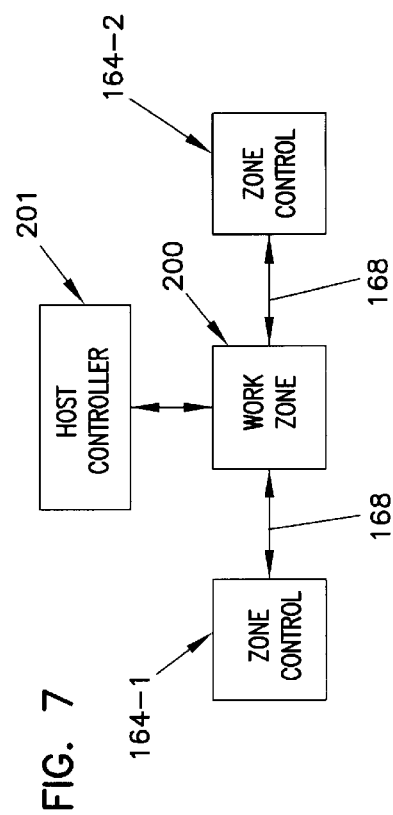
FIG. 7 is a schematic illustration of a work zone operated by a host controller.

Thus, as described, movement of workpieces is zoned controlled based upon sensor data of the control zone and status of adjacent zones. The conveyor moves a workpiece along the conveyor path to different work zones or stations 200 illustrated diagrammatically in FIG. 7. Delivery and removal of the workpiece in the work zone or station 200 is controlled by host controller 201 as shown in FIG. 7. The host controller 201 provides a status signal to receive a workpiece for processing or assembly and provide a status signal that process operations are complete so that the workpiece can continue movement along the zone controlled conveyor path.

For zone controlled operation or movement of workpieces along the conveyor path, zone control units 164-1, 164-2 energize motors 162 to accelerate rollers and product along a first portion of the control zone and decelerate motors 162 to decelerate product along a second portion of the control zone. Acceleration and deceleration movement is controlled so that product moves in a smooth fashion within each zone without the use of clutches which can be expensive, large, or in the case of mechanical clutches prone to wear.

As shown in FIG. 8, motors 162 are energized to accelerate a workpiece from an initial position 202 along a first zone segment 203 to a sensor position 204. Thereafter, workpiece is decelerated or slowed along a second zone segment 206 to an end position of the zone 208 to provide a clutchless system. Desired operating parameters such as the acceleration rate-velocity of the workpiece along the first zone segment 203, the sensor position 204 and deceleration rate along the second zone segment 206-stopping distance from the sensor can be programmed for desired zone configurations or control zone length.

Figure 9:
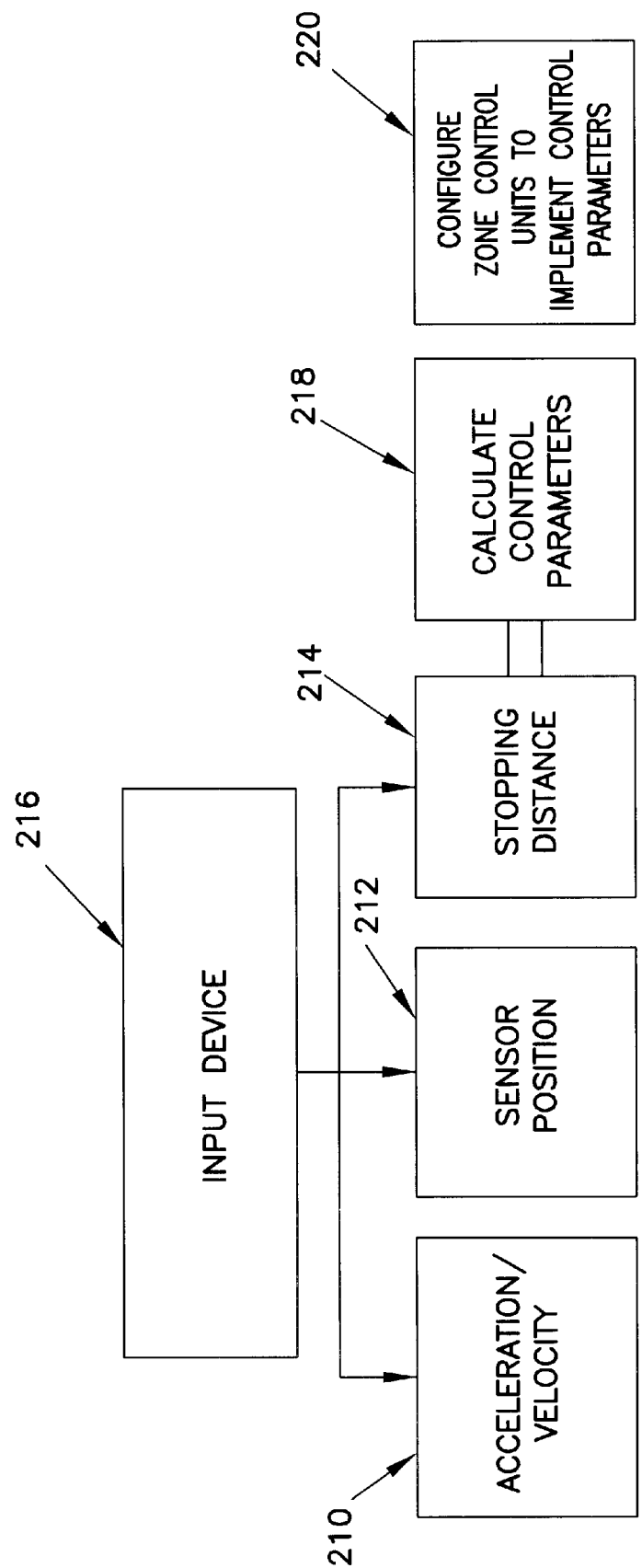
FIG. 9 is a schematic illustration of an embodiment of a flexible zone control with flexible parameter control.

As illustrated diagrammatically in FIG. 9, operating parameters for acceleration/velocity of the workpiece along the first control segment 203, sensor position 204 and stopping distance from the sensor or deceleration rate along the second control segment 206 can be user defined as illustrated by blocks 210, 212, 214 for flexible control zone configuration via input device 216. A processor calculates control parameters for the motors 162 to accelerate and decelerate the motors in the control zone based upon the inputted operating parameters such as acceleration, velocity, sensor position and stopping distance or length of the second control segment as illustrated by block 218. The processor calculates the control parameters for control segment 208 based upon velocity at the sensor, sensor position, and inputted stopping distance based upon Equations 1 and 2 as follows:

$$\Delta x = \int_{t_1}^{t_2} V_S - V_E dt \qquad \text{Eq. 1}$$

$$V_S - V_E = \int_{t_1}^{t_2} ddt \qquad \text{Eq. 2}$$

where:
  $\Delta x$ is the desired stopping distance;
  $V_S$ is the velocity at sensor;
  $V_E$ is zero velocity at the zone end position or zero; and
  d is the deceleration.

The control parameters for the desired acceleration rate, velocity and deceleration rate are downloaded to the zone control units to implement desired zone control as illustrated by block 220.

A conveyor including opposed spaced rails 152, 154 extending along a conveyor path 124 and supporting a plurality of rollers 122 therealong. The rollers 122 are powered by a plurality of drive motors 126, 162 to convey a workpiece along the conveyor path 124. At least one zone control unit 128, 164 coupled to a designated series of motors and a zone address interface 130 coupled to the at least one zone control unit 128, 164 to configure the at least one zone control unit 128, 164 to control the designated series of motors 126, 162.

A conveyor including opposed spaced rails 152, 154 extending along a conveyor path 124 and supporting a plurality of rollers 122 therealong. The rollers 122 are powered by a plurality of drive motors 126, 162 to convey a workpiece along the conveyor path 124. At least one zone control unit 128, 164 coupled to a series of the plurality of motors 126, 164 and a sensor unit supported at an intermediate position in the control zone to detect a workpiece and to provide feedback to the at least one zone control unit 128, 164 to accelerate a workpiece along a first control segment 203 and to decelerate the workpiece along the second control segment 206 based upon feedback from the sensor unit.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a disc drive system, it will be appreciated by those skilled in the art that the teachings of the present invention can be applied to other systems without departing from the scope and spirit of the present invention.

What is claimed is:
1. A combination comprising:
  opposed spaced rails extending along a conveyor path;
  a plurality of rollers spaced along the opposed spaced rails;

a plurality of drive motors coupled to the plurality of rollers to convey a workpiece along the conveyor path;

at least one zone control unit configurable to control a designated series of the plurality of motors; and a zone address interface coupled to the at least one zone control unit to configure the at least one zone control unit to control the designated series of the plurality of motors to form a control zone.

2. The combination of claim 1 wherein the zone address interface includes a plurality of motor terminals coupled to the at least one zone control unit and adaptable to selectively couple the designated series of the plurality of motors to the terminals coupled to the at least one zone control unit.

3. The combination of claim 1 wherein the zone address interface includes a programmable controller including a programmable interface to programmably couple the designated series of the plurality of motors to the at least one zone control unit.

4. The combination of claim 1 including a sensor orientated to transmit a diagonal sensor signal toward one of said opposed rails to intersect a support plane of the workpiece along the conveyor path.

5. The combination of claim 1 including a sensor unit having first and second sensors on opposed spaced rails, the first sensor being supported in a raised position above the plurality of rollers and the second sensor being supported in a lowered position below the plurality of rollers and the first and second sensors being orientated to provide a diagonal sensor path between the first and second sensors.

6. The combination of claim 1 wherein the designated series of the plurality of motors includes a first group of sequential motors and a second group of sequential motors and a sensor unit is supported between the first and second groups of sequential motors to detect an intermediate position of the workpiece in the control zone.

7. The combination of claim 1 wherein the plurality of rollers include opposed stepped wheels supported in spaced alignment along the opposed spaced rails and stepped surfaces of the stepped wheels cooperatively form multiple stepped workpiece pockets having multiple width dimensions for different workpiece sizes.

8. The combination of claim 1 wherein the plurality of drive motors includes a drive motor coupled to each roller along the conveyor path.

9. The combination of claim 1 and including a plurality of zone control units coupled to multiple designated series of the plurality of motors along the conveyor path.

10. The combination of claim 1 wherein the at least one zone control unit includes a circuit card slideably supported along the conveyor path to adjust a position of the circuit card to align the circuit card proximate to the designated series of the plurality of motors.

11. The combination of claim 10 wherein the circuit card is slideably supported in an elongated slot extending along one of said opposed spaced rails.

12. The combination of claim 1 and further including a sensor unit coupled to the at least one zone control unit and adjustably supported along the conveyor path.

13. The combination of claim 12 wherein the sensor unit includes at least one sensor slideably supported along one of the opposed spaced rails.

14. The combination of claim 12 wherein the sensor unit includes first and second sensors slideably supported in an elongated slot on the opposed spaced rails.

15. In combination:

opposed spaced rails extending along a conveyor path;

a plurality of rollers spaced along the opposed spaced rails;

a plurality of drive motors coupled to the plurality of rollers to convey a workpiece along the conveyor path;

at least one zone control unit coupled to a series of the plurality of motors in a control zone; and a sensor unit supported at an intermediate position in the control zone between a first group of motors and a second group of motors in the control zone to detect the workpiece and forming first and second control segments, the sensor unit coupled to the at least one zone control unit to provide feedback to the at least one zone control unit configured to accelerate the workpiece along the first control segment and configured to decelerate the workpiece along the second control segment based upon the feedback from the sensor unit.

16. The combination of claim 15 wherein the at least one zone control unit includes a programmable control interface to provide a user programmed acceleration rate for the first control segment.

17. The combination of claim 15 wherein the at least one zone control unit includes a programmable control interface to provide a user programmed deceleration rate or stopping distance for the second control segment.

18. The combination of claim 15 wherein the sensor unit coupled to the at least one zone control unit is adjustably supported along the conveyor path.

19. The combination of claim 15 wherein a length of the second control segment is user adjustable based upon at least one of the sensor unit position, stopping distance or deceleration rate.

20. A combination comprising:

a conveyor having a plurality of rollers driven by a plurality of zone controlled motors; and means for configuring a zone control unit to control a designated series of the plurality of zone controlled motors.

* * * * *